(12) United States Patent
Camacho

(10) Patent No.: US 9,268,195 B1
(45) Date of Patent: Feb. 23, 2016

(54) METHODS AND APPARATUS OF ENTANGLED PHOTON GENERATION USING FOUR-WAVE MIXING

(71) Applicant: Sandia Corporation, Albuquerque, NM (US)

(72) Inventor: Ryan Camacho, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 62 days.

(21) Appl. No.: 14/102,311

(22) Filed: Dec. 10, 2013

Related U.S. Application Data

(60) Provisional application No. 61/876,677, filed on Sep. 11, 2013.

(51) Int. Cl.
*G02F 1/35* (2006.01)
*G02B 27/00* (2006.01)

(52) U.S. Cl.
CPC .......... *G02F 1/3536* (2013.01); *G02B 27/0012* (2013.01)

(58) Field of Classification Search
CPC ..................................................... G02F 1/3536
See application file for complete search history.

(56) References Cited

U.S. PATENT DOCUMENTS

| | | | |
|---|---|---|---|
| 7,324,267 B2 * | 1/2008 | Melloni et al. | 359/330 |
| 2008/0285606 A1 * | 11/2008 | Kippenberg et al. | 372/32 |
| 2013/0010351 A1 * | 1/2013 | Vermeulen et al. | 359/334 |

OTHER PUBLICATIONS

Absil et al., "Wavelength conversion in GaAs micro-ring resonators," Opt. Lett. 25, 554-556 (2000).
Bååk, T., "Silicon oxynitride; a material for GRIN optics," Appl. Optics 21, 1069-1072 (1982).
Camacho, R.M., "Entangled photon generation in microresonators via accidental degeneracies," in Frontiers in Optics 2012/Laser Science XXVIII, OSA Technical Digest (online) Optical Society of America (2012). Paper LW1J.4.
Camacho, R. M., "Entangled photon generation using four-wave mixing in azimuthally symmetric microresonators," Opt. Express 20(20) , 21977-21991 (2012).
Chembo et al., "Spectrum and dynamics of optical frequency combs generated with monolithic whispering gallery mode resonators," Phys. Rev. Lett. 104, 103902 (2010).
Chembo and Yu, N., "Modal expansion approach to optical-frequency combs generated with monolithic whispering gallery mode resonators," Phys. Rev. Lett. 82, 033801 (2010).

(Continued)

*Primary Examiner* — Daniel Petkovsek
(74) *Attorney, Agent, or Firm* — Martin I. Finston

(57) ABSTRACT

A non-linear optical device is provided. The device comprises an optical disk or ring microresonator fabricated from a material that exhibits an optical nonlinearity able to produce degenerate four-wave mixing (FWM) in response to a pump beam having a pump frequency in a specified effective range. The microresonator is conformed to exhibit an angular group velocity minimum at a pump frequency within the specified effective range such that there is zero angular group velocity dispersion at the pump frequency. We refer to such a pump frequency as the "zero dispersion frequency". In embodiments, excitation of the resonator by a pump beam of sufficient intensity at the zero-dispersion frequency causes the resonator to emit a frequency comb of entangled photon pairs wherein the respective frequencies in each pair are symmetrically placed about the zero-dispersion frequency.

6 Claims, 4 Drawing Sheets

(56) References Cited

OTHER PUBLICATIONS

Chen, Z.H. et al., "Frequency-bin entangled comb of photon pairs from a Silicon-on-Insulator micro-resonator," Opt. Express 19, 1470-1483 (2011).

Clemmen et al., "Continuous wave photon pair generation in silicon-on-insulator waveguide and ring resonators," Opt. Express 17, 16558-16570 (2009).

Del'Haye, et al., "Optical frequency comb generation from a monolithic microresonator," Nature 450, 1214-1217 (2007).

Ferdous et al., "Spectral line-by-line pulse shaping of on-chip microresonator frequency combs," Nat. Photonics 5, 770-776 (2011).

Ferrera et al., "On-chip CMOS-compatible all-optical integrator," Nat. Commun 1, 29 (2010).

Helt et al., "Spontaneous four-wave mixing in microring resonator," Opt. Lett. 35, 3006-3008 (2010).

Johnson, A.R. et al., "Chip-based frequency combs with sub 100GHz repetition rates," Opt. Lett. 37, 875-877 (2012).

Kippenberg et al., "Microresonator-Based optical frequency combs," Science 332, 555-559 (2011).

Levy, J.S. et al., "CMOS-compatible multiple-wavelength oscillator for on-chip optical interconnects," Nat. Photonics 4, 27-40 (2010).

Malitson, "Interspecimen comparison of the refractive index of fused silica," J. Opt. Soc. Am. 55, 1205-1208 (1965).

Razzari et al., "CMOS-compatible integrated optical hyper-parametric oscillator," Nat. Photonics 4, 41-45 (2010). S "Scholz et al., Analytical treatment of spectral properties and signal/idler intensity correlations for a double-resonant optical parametric oscillator far below threshold," Opt. Commun. 282, 3518-3523 (2009).

Turner, A.C. et al, "Ultra-low power parametric frequency conversion in a silicon microring resonator," Opt. Lett. 25, 554-556 (2000).

\* cited by examiner

METHODS AND APPARATUS OF ENTANGLED PHOTON GENERATION USING FOUR-WAVE MIXING

CROSS-REFERENCE TO RELATED APPLICATIONS

This application claims priority from U.S. Provisional Patent Application Ser. No. 61/876,677, filed on Sep. 11, 2013 by R. Camacho under the title "Methods and Apparatus of Entangled Photon Generation Using Four-Wave Mixing," which application is commonly owned herewith and the entirety of which is incorporated herein by reference.

STATEMENT OF GOVERNMENT INTEREST

This invention was developed under Contract DE-AC04-94AL85000 between Sandia Corporation and the U.S. Department of Energy. The U.S. Government has certain rights in this invention.

ART BACKGROUND

The generation of entangled photons is an essential element in current approaches to quantum information processing and quantum communication. In particular, it is often desirable to generate entangled photons having narrow spectral bandwidths to facilitate coupling to long-lived quantum memories or repeaters.

Various physical mechanisms have been considered for generating entangled photons. One such mechanism is four-wave mixing (FWM). In particular, FWM in chip-scale microresonators has been proposed as potentially advantageous means for producing narrowband entangled photons.

FWM in microresonators is usually performed in systems, such as disk and ring resonators, that have azimuthal symmetry (also referred to herein as "cylindrical" symmetry). Such systems are advantageous because, among other reasons, they readily permit near-equal mode spacing, small mode volumes, and high optical quality factors.

For entangled photon production, an underlying electronic nonlinearity is utilized to produce spontaneous degenerate FWM. (Driven FWM has also been considered. In particular, it has been shown that driving above the parametric oscillation threshold can produce frequency combs.) More specifically, if the resonant disk or ring is composed of a material with a third-order nonlinear suceptiblity $\chi(3)\,(\rho, z)$, then upon pumping the resonator with a strong pump beam of frequency $\omega_p$ selected to couple into mode m of the ring, a process may occur by spontaneous FWM in which two pump photons are annihilated to produce an entangled pair of signal and idler photons of respective frequencies $\omega_s$ and $\omega_i$. However, the process must conserve both energy and momentum. The conservation of energy requires that $\omega_s + \omega_i = 2\omega_p$.

The conservation of momentum requires that $m_s + m_i = 2m_p$, in which $m_s$, $m_i$, and $m_p$ are the respective mode numbers for the signal, idler, and pump waves.

Various investigators have attempted to theoretically model the spectrum resulting from spontaneous and driven FWM in azimuthally symmetric systems. Although it has been more common in these efforts to approximate the cylindrical resonator as an unfolded straight waveguide, several investigators have employed a representation in cylindrical coordinates, which is more naturally suited to systems with azimuthal symmetry.

For example, a fully vectorial treatment of cascaded FWM in a spherical resonator, taking into account all components of the electric field, spatial mode overlaps, and resonator dispersion profiles was reported in Y. K. Chembo and N. Yu, "Modal expansion approach to optical-frequency-comb generation with monolithic whispering-gallery-mode resonators," *Phys. Rev. A* 82, 033801 (2010) and in Y. K. Chembo, D. V. Strekalov, and N. Yu, "Spectrum and dynamics of optical frequency combs generated with monolithic whispering gallery mode resonators," *Phys. Rev. Lett.* 104, 103902 (2010). Although those results apply only to spherical resonators and neglect material dispersion, they successfully track the spectral evolution resulting from the FWM interaction.

A theoretical study of the quantum correlations resulting from spontaneous FWM in azimuthally symmetric ring resonators was presented in J. Chen, Z. H. Levine, J. Fan, and A. L. Migdall, "Frequency-bin entangled comb of photon pairs from a Silicon-on-Insulator micro-resonator," *Opt. Express* 19, 1470-1483 (2011). That work predicted that FWM in an azimuthally symmetric ring resonator could be used to generate a frequency-bin entangled comb of photon pairs. However, that work included certain implicit assumptions based on rectilinear rather than cylindrical resonator geometries.

More specifically, in their quantum formalism the authors enforced a phase-matching condition that involved integrating an effective linear group velocity and linear wavevector (i.e., k-vector) over an unfolded cavity of specified linear length. In a cylindrical system, however, the linear momentum is zero and the linear wavevector and group velocities are poorly defined, particularly for small resonator radii, such as radii approaching ten or fewer times the resonant wavelength. Moreover, because cylindrical resonator systems lack translational symmetry, the accuracy with which optical wave propagation can be modeled using a linear wavevector is limited. Greater accuracy would be achieved using the angular wavevector and angular group velocities.

One thing that has been lacking, until now, is a fully vectorial quantum model in cylindrical coordinates to describe spontaneous FWM in axially symmetric systems, which might facilitate new design approaches and even lead to new optical devices based on properties revealed by the use of such a model.

SUMMARY OF THE INVENTION

We have developed a non-linear optical device that exhibits FWM. The device comprises an optical disk or ring microresonator fabricated from a material that exhibits an optical nonlinearity able to produce degenerate four-wave mixing (FWM) in response to a pump beam having a pump frequency in a specified effective range. The microresonator is conformed to exhibit an angular group velocity minimum at a pump frequency within the specified effective range such that there is zero angular group velocity dispersion at the pump frequency. We refer to such a pump frequency as the "zero dispersion frequency".

In embodiments, excitation of the resonator by a pump beam of sufficient intensity at the zero-dispersion frequency causes the resonator to emit a frequency comb of entangled photon pairs wherein the respective frequencies in each pair are symmetrically placed about the zero-dispersion frequency.

BRIEF DESCRIPTION OF THE DRAWINGS

FIG. 2a is a graph of the mode frequency versus angular wavenumber m. Insets to FIG. 2a graphically represent the spatial profiles $u_m(\rho, z)$ for two illustrative wavenumbers.

FIG. 2b is a graph of the free spectral range (FSR) $f_m$ and its first derivative, versus the angular wavenumber m.

FIG. 2c provides a bi-photon signal spectrum. Insets to FIG. 2c provide magnified views of two peaks in the spectrum, illustrating a phenomenon by which walk-off in the resonator FSR leads to a growing mismatch in energy conservation which grows to almost a complete linewidth by the second sideband.

FIG. 3a is a graph of the mode frequency versus angular wavenumber m. Insets to FIG. 3a graphically represent the spatial profiles $u_m(\rho, z)$ for two illustrative wavenumbers.

FIG. 3b is a graph of the free spectral range (FSR) $f_m$ and its first derivative, versus the angular wavenumber m. Two shaded regions beneath the FSR curve represent areas proportional to the spectral intervals between the pump mode and respectively the signal and idler modes. Equal areas on either side of the pump mode indicate energy conservation. Two special modes which conserve energy far outside the flat dispersion bandwidth of the ring are indicated by solid dots superimposed on the FSR curve.

FIGS. 3c and 3d are bi-photon generation spectra predicted when the pump beam is respectively tuned to the mode nearest zero angular group velocity dispersion and to a particular mode of higher wavenumber than the mode of FIG. 3c, which gives rise to the signal-idler pair indicated by the solid dots in FIG. 3b.

DETAILED DESCRIPTION

In systems with azimuthal symmetry, the optical eigenmodes of the system as expressed in cylindrical coordinates may be labeled by an integer angular wavenumber m; thus the (azimuthally symmetric) electric field distribution for mode m may be expressed by $E_m(r,t) = E_m(\rho,z) e^{-i(\omega_m t + m\phi)}$. Here r and t are respectively the spatial and time coordinates, and $\rho$ and z have their usual meaning as the azimuth-independent cylindrical coordinates.

Figure 1:
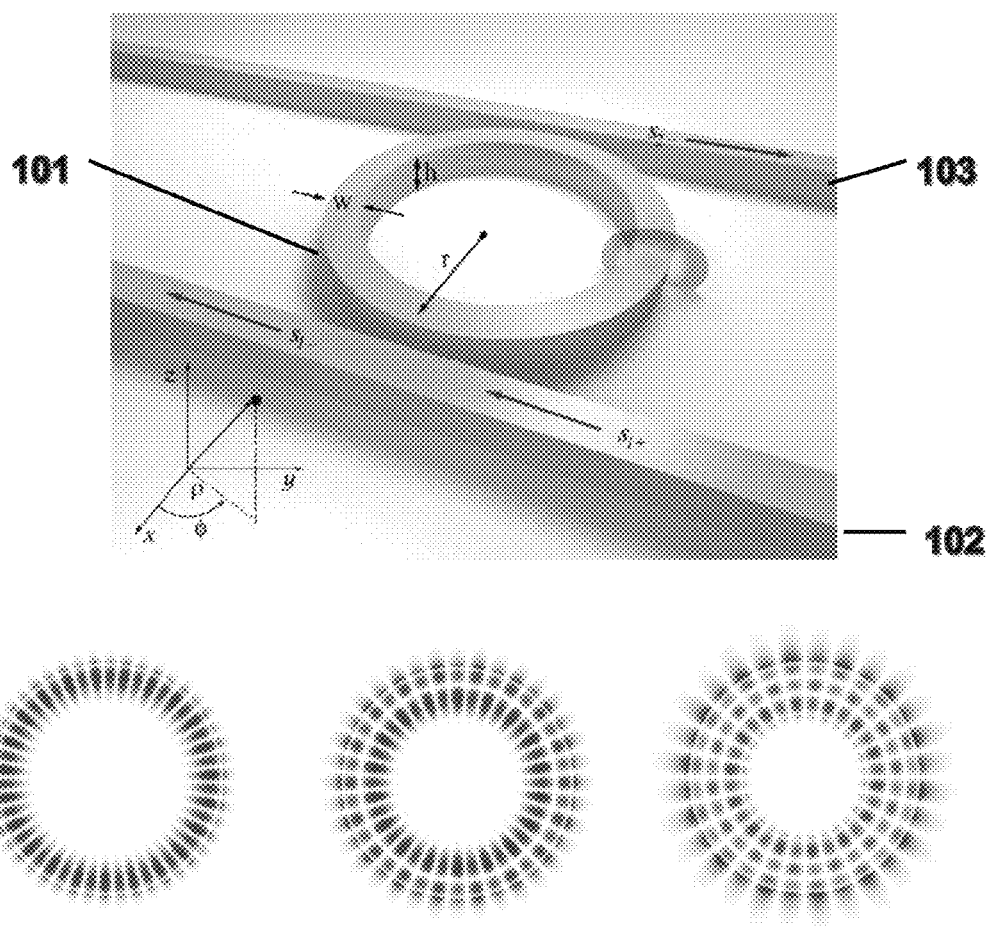
FIG. 1 provides a schematic drawing of an exemplary optical ring resonator, illustrating the ring geometry. Also illustrated in the figure are example radial field profiles ($E_\rho$) of three optical modes of the resonator.

FIG. 1 illustrates the geometry considered here with the example of a ring resonator 101 of outer radius r, width w (which is the difference between the inner and outer radii of the ring), and height h. As seen in the figure, the ring is optically coupled by proximity to a pair of linear waveguides 102, 103 bearing the respective input and output optical signals. The cylindrical coordinate system is also shown in an inset to the figure. As is conventional, the radial coordinate $\rho$ lies in the xy plane, the z-axis, which is the symmetry axis of the resonator, is perpendicular to the xy plane, and the azimuthal coordinate $\phi$ measures rotation about the z-axis.

Also indicated in the figure are examples of the radial field profiles $E_\rho (\rho,z)$ for three TE-like resonant modes with differing angular wavenumbers and radial orders. Specifically, the modes represented in the figure are the first three radial modes with odd vector symmetry about the z-axis (TE-like modes).

It should be noted in this regard that the modeling results presented here were based on numerical calculations that considered only the fundamental radial TE-like modes.

As can be seen from each of the field profiles, the circumnavigating field near the outside of the mode travels a much greater linear distance than the field near the inside of the mode, leading to linear group and phase velocities that depend on the coordinate $\rho$. As those skilled in the art will understand, the angular group and phase velocities are therefore better suited to describing optical propagation in the illustrative system.

As noted above, if the resonant disk or ring is composed of a material with a third-order nonlinear susceptibility $\chi^{(3)}(\rho, z)$, then upon pumping the resonator with a strong pump beam of frequency $\omega_p$ selected to couple into mode m of the ring, a process may occur by spontaneous FWM in which two pump photons are annihilated to produce an entangled pair of signal and idler photons of respective frequencies $\omega_s$ and $\omega_i$. However, the process must conserve both energy and momentum. (It should be noted that what is meant here is angular, not linear, momentum.) The conservation of energy requires that $\omega_s + \omega_i = 2\omega_p$. The conservation of angular momentum requires that $m_s + m_i = 2m_p$, in which $m_s$, $m_i$, and $m_p$ are the respective mode numbers for the signal, idler, and pump waves.

Upon consideration of the integer solutions ($m_s$, $m_i$) of the momentum condition $m_s + m_i = 2m_p$ for given integer $m_p$, it will be understood that if $m_s$ is less than $m_p$ by an integer amount $\Delta m$, then $m_i$ will exceed $m_p$ by the same amount, and vice versa. Hence, for any value of $\Delta m$ in a range limited only by the value of $m_p$, there will be a pair of phase matched modes at $m^+ = m_p + \Delta m$ and $m^- = m_p - \Delta m$.

The possible solutions to the energy condition $\omega_s + \omega_i = 2\omega_p$ are more limited, however, because although $\omega_m$ is discrete, it can assume values that are not necessarily equally spaced in the continuum from which they are drawn. Hence, the dispersion of the optical modes, or in other words their spectral spacing, is the most important factor for determining whether spontaneous FWM will occur and produce entangled photon pairs.

By quantizing the electromagnetic field in the cylindrical resonator and using first-order perturbation theory, we derived an expression, provided below, for calculating the spectra of entangled photon pairs ("bi-photon spectra") generated by our system. Selected steps in our analysis are presented below. As the full analysis is not necessary for practical implementation of our discoveries as described here, we have omitted it for brevity. Those wishing to consult the full analysis may refer, for example, to R. M. Camacho, "Entangled photon generation using four-wave mixing in aximuthally symmetric microresonators," Optics Express, Vol. 20, Issue 20, 21977-21991 (2012).

The quantized electric field operator for a mode labeled by the mode index k may be written $$\hat{E}_k(r, t) = i \sqrt{\frac{\hbar \omega_k v_{gk}}{2\varepsilon_0 v_{pk}}} \left[\hat{a}_k^\dagger(t)\right] u_k(r), \quad (1)$$

where $u_k(r)$ is a spatial function describing the mode profile, normalized such that $$\int_V \varepsilon(r) u_{k_1}(r) \cdot u_{k_2}(r) = \delta_{k_1, k_2}. \quad (2)$$

It should be noted that the group and phase velocities are explicitly included in the normalization of the electric field operator. This is essential if the total energy of of the system is to be accounted for in a Hamiltonian formulation.

Here $v_g$ and $v_p$ are respectively the group and phase velocities, $\in(r)$ is the dielectric constant (equal to $\in_0$ in free space), and $\hat{\alpha}_k^\dagger(t)$ and $\hat{\alpha}_k(t)$ are respectively the creation and destruction operators well-known from quantum mechanical formalism.

Equation (1) is valid in any coordinate system, but specializing to the case of azimuthal symmetry yields certain simplifications and insights. Importantly, it is the ratio of the angular phase and group velocities that are relevant in this case, since the unfolded linear phase and group velocities are not well-defined (i.e. they depend on r). The angular phase and group velocities (in units of radians/s) may be written $$v_{p_m} = \frac{\omega_m}{m} \tag{3a}$$

$$v_{g_m} = \frac{\partial \omega_m}{\partial m} \approx \frac{\Delta \omega_m}{\Delta m} = 2\pi f_m, \tag{3b}$$

where $f_m$ is the free spectral range (FSR), in Hertz, near mode m.

Using first order perturbation theory, we may also write angular group velocity in terms of the respective electric and magnetic fields $E_m(r)$, $H_m(r)$:

$$v_{g_m} = \frac{\int_S |\hat{\varphi} \cdot [E_m(r) \times H_m^*(r)]|}{\frac{1}{2} \int_V \varepsilon_0 \left.\frac{d[\omega \varepsilon(r,w)]}{d\omega}\right|_{\omega_m} \{|E_m(r)|^2 + \mu_0 |H_m(r)|^2\}} \tag{4}$$

which is simply the integrated energy flux passing through a cross-sectional area of the loop divided by the total field energy in the loop. Equation (4) is especially useful when numerically calculating the dispersion of the system. It gives the free spectral range (FSR) directly from the fields, obviating the taking of a finite difference of the unknown quantity $\omega_m$. In addition, it gives an exact value for the group velocity rather than the approximate value $\Delta \omega_m / \Delta m$, which becomes less accurate when the FSR is large.

The two-photon wavefunction for signal-idler pairs generated in a FWM interaction is:

$$|\psi\rangle = 2i\pi^2 \sum_{\Delta m} \int_{\rho,z} \chi^{(3)}(\rho,z) \rho |E_p(\rho,z)|^2 \sqrt{m_+ m_- f_{m_+} f_{m_-}} \hat{a}_p \hat{a}_p \times \tag{5}$$

$$\int_{\Omega_S} \hat{a}^\dagger(\omega_{m_+} + \Omega_S) \hat{a}^\dagger(\omega_{m_-} + \Delta_0 - \Omega_S)$$

$$\frac{-2\kappa_I}{[-i\Omega_S + \kappa_{tot}][-i(\Delta_0 - \Omega_S) + \kappa_{tot}]} u_{m_+} \cdot u_{m_-} |0\rangle,$$

where $m^\pm = m_p \pm \Delta m$ ensures momentum conservation and $\Delta_0 \equiv 2\omega_p - (\omega_{m_s} + \omega_{m_i})$ is the spectral walk-off that quantifies the extent to which the process deviates from perfect energy conservation.

In deriving Eq. (5), we assumed a monochromatic pump with a classical amplitude, and we made use of a two-port cavity input/output formalism in which $\kappa_I$ represents an intrinsic loss rate and $\kappa_{tot}$ is the total loss rate (intrinsic and extrinsic). We also made the approximation that the cavity linewidth is much less than the FSR ($\kappa_{tot} \ll f_m$).

Given the two-photon wavefunction, it is straightforward to calculate quantities such as the bi-photon production rate $\langle \psi|\psi \rangle$, the single-photon spectrum $\langle \psi|\hat{a}^\dagger(\omega)\hat{a}(\omega)|\psi \rangle$, and the coincidence spectrum.

For example, the signal beam spectrum, more specifically the single-photon spectrum for one of the two photons in a bi-photon pair, is $$\langle \psi|\hat{a}^\dagger(\omega_s)\hat{a}(\omega_s)|\psi \rangle = \tag{6}$$

$$4\pi^4 \sum_{\Delta m} \frac{4\kappa_I^2 m_+ m_- f_{m_+} f_{m_-}}{|\kappa_{tot} - i(\omega_s - \omega_{m_+})|^2 |\kappa_{tot} + i(\omega_s - \omega_{m_-} - \Delta_0)|^2} \times$$

$$\left[\int_{\rho,z} \chi^{(3)}(\rho,z) \rho |E_p(\rho,z)|^2 u_{m_+} \cdot u_{m_-}\right]^2.$$

The idler spectrum may similarly be calculated by replacing $\omega_s$ with $\omega_i$.

The design for a typical disk or ring resonator is specified by the resonator material, the composition of the surrounding material or materials, the outer diameter, the height, and for a ring resonator, the inner diameter. Of course the width of the ring may equivalently be specified instead of the inner or outer diameter.

The field profiles $u_m(r)$ and the eigenfrequencies $\omega_m$ can be calculated using, e.g., a fully vectorial 2-D axially symmetric weighted residual formulation of Maxwell's equations as implemented, for example, in Comsol Multiphysics software available from COMSOL, Inc., 10850 Wilshire Blvd., Suite 800, Los Angeles, Calif. 90024, www.comsol.com.

An iterative approach can be used to incorporate material dispersion, which is expressed using a Sellmeier equation for the wavelength dependent dielectric constant. The dielectric constant of silicon nitride, for example, may be approximated by $$\varepsilon = 1 + \frac{C_1 \lambda^2}{\lambda^2 - C_2^2},$$

wherein $C_1 = 2.8939$ and $C_2 = 0.13967$. Similarly, the wavelength dependent dielectric constant of silicon dioxide may be approximated by $$\varepsilon = 1 + \frac{C_1 \lambda^2}{\lambda^2 - C_2^2} + \frac{C_3 \lambda^2}{\lambda^2 - C_4^2} + \frac{C_5 \lambda^2}{\lambda^2 - C_5^2},$$

wherein $C_1 = 0.6961663$, $C_2 = 4.67914826 \times 10^3$, $C_3 = 0.4079426$, $C_4 = 1.35120631 \times 10^2$, $C_5 = 0.8974794$, and $C_6 = 97.9340025 \times 10^2$.

More information about modeling the wavelength-dependent dielectric constant may be gained, for example, from T. Bååk, "Silicon oxynitride; a material for GRIN optics," *Appl. Optics* 21, 1069-1072 (1982) and I. H. Malitson, "Interspecimen comparison of the refractive index of fused silica," *J. Opt. Soc. Am.* 55, 1205-1208 (1965).

Given the field profiles and the eigenfrequencies, it is straightforward to calculate the local FSR $f_m$ for each eigenmode, the spectral walk-off $\Delta_0$, and the spectra of the signal and idler photons using the equations presented above.

Using the analysis presented above, we calculated the spectra of entangled bi-photons generated by resonators of representative designs in two illustrative geometries: a thick silicon nitride disk and a larger silicon nitride ring. In the ring resonator, we discovered a special situation in which the dispersion in the ring resonator allows for generation of entangled pairs with extremely wide spectral separation, while suppressing pair generation for closely spaced modes.

Referring ahead to FIG. 3d, for example, it will be seen that an angular wavenumber (corresponding to a particular pump frequency) was identified at which there is zero angular group velocity dispersion, which as will be understood from the foregoing analysis also corresponds to a stationary point—here a minimum—in the graph of angular group velocity or of free spectral range versus angular wavenumber.

In the example of FIG. 3d, excitation of the resonator by a pump beam of sufficient intensity at the zero-dispersion frequency produced a frequency comb of entangled photon pairs, but similar excitation at a particular frequency offset from the zero-dispersion frequency caused the resonator to emit entangled photons in a pair of frequencies that were symmetrically placed relative to the pump frequency and were widely spaced relative to the emissions in the concurrently emitted frequency comb.

By "widely spaced" in this regard, we mean that the frequency pair is separated by more than the full width at half-maximum of any concurrently emitted frequency comb. In fact, the frequency pair in the example presented was also separated by more than the full width at half-maximum of the frequency comb emitted when the resonator was excited at the zero-dispersion frequency.

Example 1

This example is provided, in part, as a pedagogical aide to introduce the interpretation of our computational results, and it is provided, in part, as a basis for comparison to the surprising results described below in Example 2.

We modeled a silicon nitride disk, suspended in air, with a radius of 20 μm and a thickness of 250 nm. Silicon nitride was of interest because it is an important optical material whose spectral bandgap lies above the energy required for two-photon absorption at the 1550 nm communication wavelength.

FIG. 2a provides a plot of the frequency $2\pi\omega_m$ of the fundamental TE-like mode of the disk as a function of the angular wavenumber m. This mode has odd vector symmetry about the z-axis. Physically, m represents the number of wavelengths that fit around the disk for a given mode. Small values of m correspond to low frequency and long wavelength; in that regime the mode field tends to spill out into the surrounding air. At larger values of m, however, the mode field tends to be pulled into the dielectric.

As an aide to interpretation of the figure, we have added an air line and a dielectric (in this instance, silicon nitride) line, which respectively indicate the (fictitious) frequency f each mode would have were it contained completely within the air medium or the silicon nitride medium, while possessing the same mode profile. The equation for the air or silicon nitride line, in terms of an effective radius $r_{eff}$ and a dielectric constant E of the respective medium, is $$\tilde{f}(m) = \frac{mc}{2\pi} r_{eff} \sqrt{\varepsilon}.$$

Qualitatively speaking, the mode must be bounded by these two lines and must asymptotically approach one or the other as m tends respectively to zero or infinity. Mode dispersion occurs as a result of the transition of the mode frequency from the air line to the dielectric line.

FIG. 2b provides a plot of the first derivative (left-hand scale) and second derivative (right-hand scale) of $2\pi\omega_m(m)$. The first derivative corresponds to the free spectral range (FSR) of the resonator, as will be understood from the foregoing analysis. The second derivative thus indicates the change $\Delta f_m$ in the FSR per mode. The results of two methods for calculating the FSR are shown in the figure: the solid line was calculated using a direct difference of two eigenfrequencies as expressed in Eq. (3b), above, and the data points represented as circles were calculated using the field profile from a single solution, as expressed by Eq. (4), above. As will be understood from inspection of the figure, the two methods were found to have excellent agreement.

As would be expected, the FSR decreases as the mode transitions from the air line to the dielectric line. As seen, the FSR ultimately levels off to a value near 1.2 THz. An important observation is that the FSR decreases monotonically for the represented range in m; this is most evident upon reference to the derivative of the FSR (as a function of m), which is seen to be consistently negative. As a consequence, there is no point of zero angular group velocity dispersion (where the FSR would be stationary and the derivative would be zero).

It will be recalled from the preceding discussion that energy can be perfectly conserved in an FWM interaction only if $\omega_s + \omega_i = 2\omega_p$. This, in turn, demands emission into a pair of modes (i.e. the signal and idler modes) whose respective frequencies are symmetrically placed about the pump frequency, which by assumption corresponds to angular wavenumber m as indicated on the horizontal axis of the figure. By "symmetrically placed" is meant that the respective emission frequencies fall at equal intervals above and below the pump frequency. The FSR, however, is equivalent to the frequency spacing (and equivalently, the energy spacing) of the modes. It is clear on reference to the figure that any pair of emissive modes that conserve energy must violate the momentum conservation rule requiring $m_s + m_i = 2m_p$, since to balance the energy of a mode placed a certain wavenumber interval to the left of the pump mode, would require a second mode placed a greater wavenumber interval to the right of the pump mode.

FIG. 2c provides a spectrum, according to Eqn. (6), of the entangled photons emitted from the resonator when it is pumped near 1.55 μm (m=109). An optical quality factor of $10^5$ (i.e. $\kappa_j = \kappa_{tot} = \omega_m/10^5$) has been assumed for the disk; this is a value readily obtainable experimentally for silicon nitride disks with the geometry described here.

The spectrum has been normalized such that a peak will have a value of unity when the mode pair ω+ and ω− corresponding to that peak exactly conserve energy ($\Delta_0 = 0$), have identical angular group velocities ($f_+ = f_-$), and have a perfect spatial overlap [$u_+(r) = u_-(r) = u_p(r)$], and the approximation $m_+ \approx m_- \approx m_p$ is valid. Any reduction in the amplitude of a peak in the spectrum results from one of these criteria not being fulfilled, and is dominated by nonzero values of the walk-off $\Delta_0$, signifying that energy is not perfectly conserved.

The dotted reference line in FIG. 2(b) shows the location of the pump beam on the dispersion walk-off curve $\Delta f_m$. As can be seen, the change in the FSR for each successive mode is approximately 2 GHz, which corresponds to approximately a full linewidth at the pertinent frequencies. (For example, 200 THz/105=2 GHz). Consequently, the first-order sidebands in the spectrum are reduced by almost one-half from the ideal case, and the second-order sidebands and beyond are strongly suppressed owing to the walk-off.

Example 2

We modeled a silicon nitride ring of radius r=20 μm, clad with silicon dioxide, and of width w=1.1 μm and thickness h=750 nm.

Figure 2:
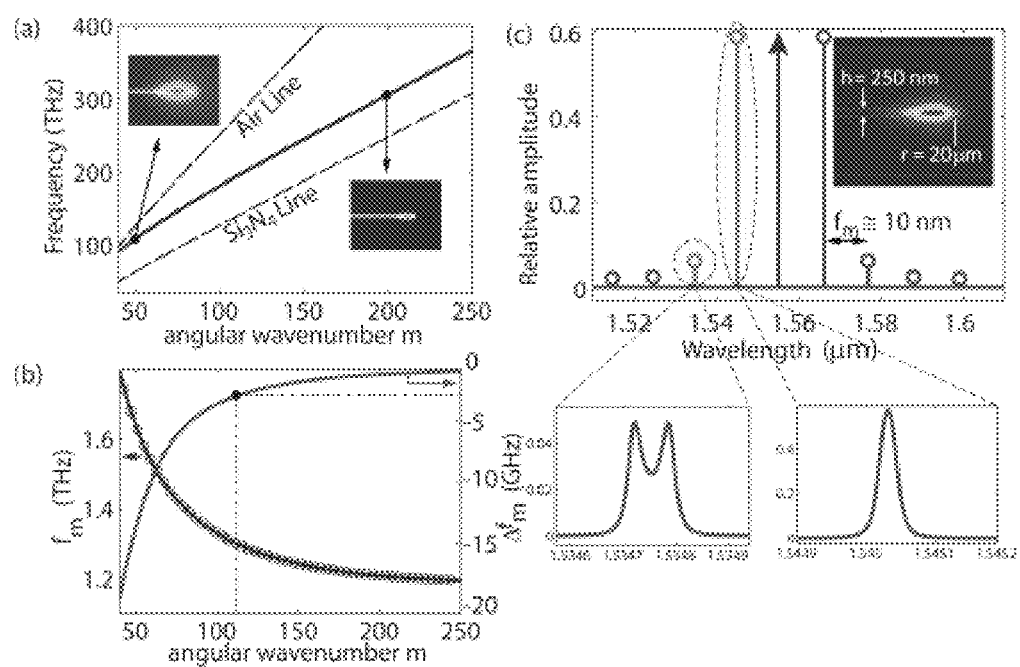
FIGS. 2a-2c provide certain results of numerical modeling of an exemplary optical disk resonator.
Figure 3:
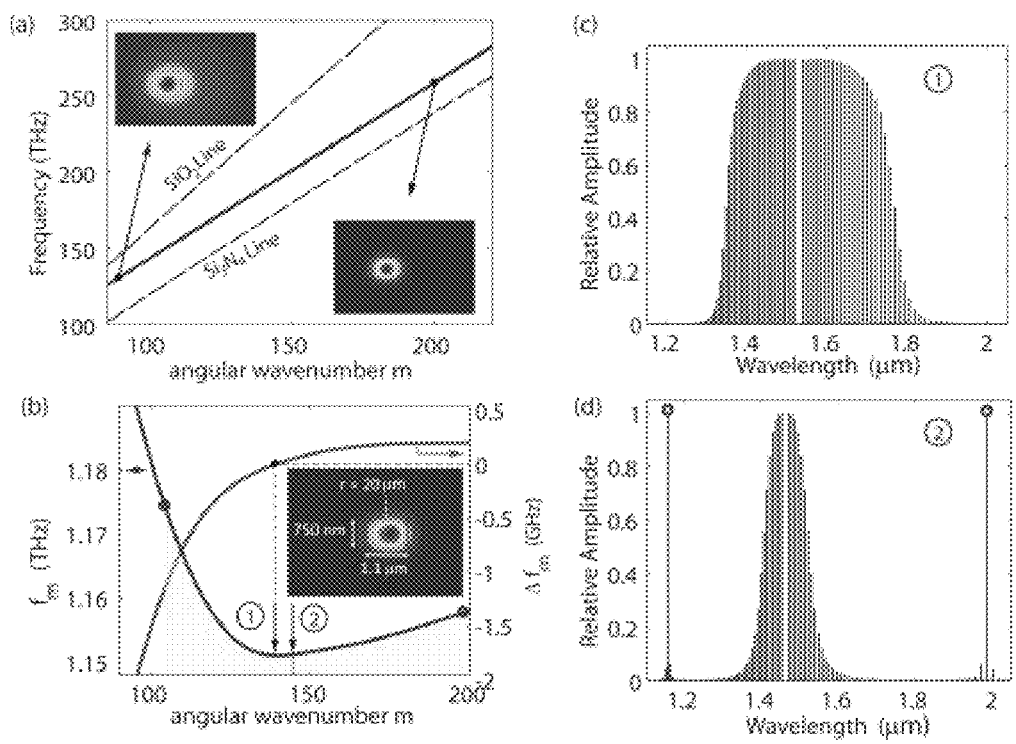
FIGS. 3a-3d provide certain results of numerical modeling of an exemplary optical ring resonator.

FIG. 3 provides a set of plots analogous to those of FIG. 2, but with certain important qualitative differences readily apparent.

FIG. 3a provides a plot of the frequency $2\pi\omega_m$ of the fundamental TE-like mode of the ring as a function of the angular wavenumber m. As seen in the figure, the mode frequency is again bounded by two light lines, which in this case correspond to the silicon dioxide medium and the silicon nitride medium. The mode frequency is seen to transition from one light line to the other as m increases.

FIG. 3b provides a plot of the first derivative (left-hand scale) and second derivative (right-hand scale) of $2\pi\omega_m(m)$. Unlike the case of the thin disk as seen in FIG. 2b, the FSR as seen here does not decrease monotonically, but instead undergoes a steep decrease, followed by a shallow increase. Correspondingly, the graph of mode frequency versus wavenumber changes from negative to positive curvature as it shifts from the regime dominated by one asymptote to the regime dominated by the other).

In fact, we observed that a similar change in curvature will also occur in the thin disk of Example 1, but only at higher frequencies where the optical mode field is much more strongly confined by the high-index dielectric and approaches the dielectric light line more closely.

With further reference to FIG. 3b, and continuing with the present example, it will be seen that the FSR curve passes through a minimum, and the derivative curve passes through zero, at a point marked with the numeral "1" in the figure at an angular wavenumber m of about 137. Thus, there is at that point a zero-crossing in $\Delta f_m$, signifying a point of zero angular group velocity dispersion. As will be explained in more detail below, the identification of a zero-dispersion frequency can be utilized to produce more desirable entangled photon spectra.

We chose the geometry of the ring so that the zero-dispersion point would occur near a wavelength of 1550 nm. Through numerical modeling using the results presented here, it is likewise possible to select design parameters of the resonator, including its composition and dimensions, to yield any of a range of desired zero-dispersion frequencies. In particular, an iterative procedure may be used, in which an initial estimate of design parameters leads to an initial spectral calculation, which may lead to one or more refined estimates followed by further calculations, until a comparison indicates that the predicted and desired spectral properties agree to within a specified margin.

FIG. 3c provides a spectrum, according to Eqn. (6), of the entangled photons emitted from the resonator when it is pumped at m=137, which in this example is the zero-dispersion point. The spectrum is seen to consist of many comb-like pairs which are pair-wise entangled and cover a broad spectrum with near-unity relative amplitude.

We note in this regard that the above-cited work by J. Chen et al. (2011) predicted that excitation of a cylindrically symmetrical microresonator at a zero-dispersion frequency could result in the generation of frequency-binned entangled photon pairs. However, as we pointed out above, Chen's analysis had non-physical aspects because it was not based explicitly on angular eigenmodes, and as a consequence was subject to inaccuracies that we believe we have avoided in our work. In our model, by contrast, we explicitly calculate angular eigenmodes based on the angular wavenumber, angular group-velocity, and angular group velocity dispersion.

FIG. 3d provides a spectrum, according to Eqn. (6), of the entangled photons emitted from the resonator when it is pumped at the angular wavenumber identified by the numeral "2" in the figure, which lies slightly above the zero-dispersion point. The number of lines in the comb-like spectra is now seen to be reduced due to the faster dispersion walk-off (i.e., a nonzero value of $\Delta_0$).

However, two large peaks now surprisingly appear in the spectrum at large values of $\Delta m$. The cause of these peaks is an accidental degeneracy in the energy (or frequency) separation between the pump beam and respective signal and idler modes that lie at equal wavenumber intervals from the pump wavenumber.

The phenomenon may be physically understood as follows: The total frequency separation between the pump mode $\omega_p$ and any other mode $\omega_m$ is given by the discrete sum of the FSR between each mode and the next, beginning on $\omega_p$ and ending on $\omega_m$. This sum is shown graphically as the area under the $f_m$ curve in FIG. 3b.

When the pump beam is slightly detuned from the minimum dispersion point to the side with a shallow slope (i.e., in the direction of increasing wavenumber), there exists a unique $\Delta m$ at which the respective areas under the curve to the left and to the right of the pump are equal. It will be understood that no such point exists when the pump is detuned in the direction of decreasing wavenumber, because the area on the left will always be larger than the area on the right.

The result is the existence of two special modes which exactly conserve both energy and momentum in the FWM process, and can therefore be used to produce narrow-band entangled photons with very large differences in wavelength. Entangled photon pairs from these modes are readily filtered from the central comb modes using a broadband filter. This can lead, for example, to an on-chip spectrally bright source of widely spaced narrowband entangled photons.

As noted, our calculations assume a quality factor of $10^5$. We believe that it would be experimentally feasible to increase the quality factor to $10^6$ or even more. A pertinent discussion of high quality factors may be found, for example, in J. S. Levy, A. Gondarenko, M. A. Foster, A. C. Turner-Foster, A. L. Gaeta, and M. Lipson, "CMOS-compatible multiple-wavelength oscillator for on-chip optical interconnects," *Nat. Photonics* 4, 37-40 (2010).

At a quality factor for the resonator of $10^6$, the central comb region would be further suppressed (more specifically, there would exist ten times fewer modes in the central comb region), but a zero-dispersion point would still fall in the wings of the spectrum. This can lead, for example, to a chip-scale, CMOS-compatible technology for providing low-cost sources of spectrally bright entangled photons. Moreover, on-chip filtering and processing of the entangled photons could lead to chip-scale quantum processing and networking.

Optical resonators as described above are manufacturable by known techniques, such as well-known CMOS fabrication methods. Patterning on the dimensional scales required is readily achieved by electron-beam lithography or photolithography. The steps performed in the fabrication of specific exemplary disk and ring microresonators are described, for example, in J. S. Levy et al., *Nat. Photonics* 4, 37-40 (2010), cited above.

Figure 4:
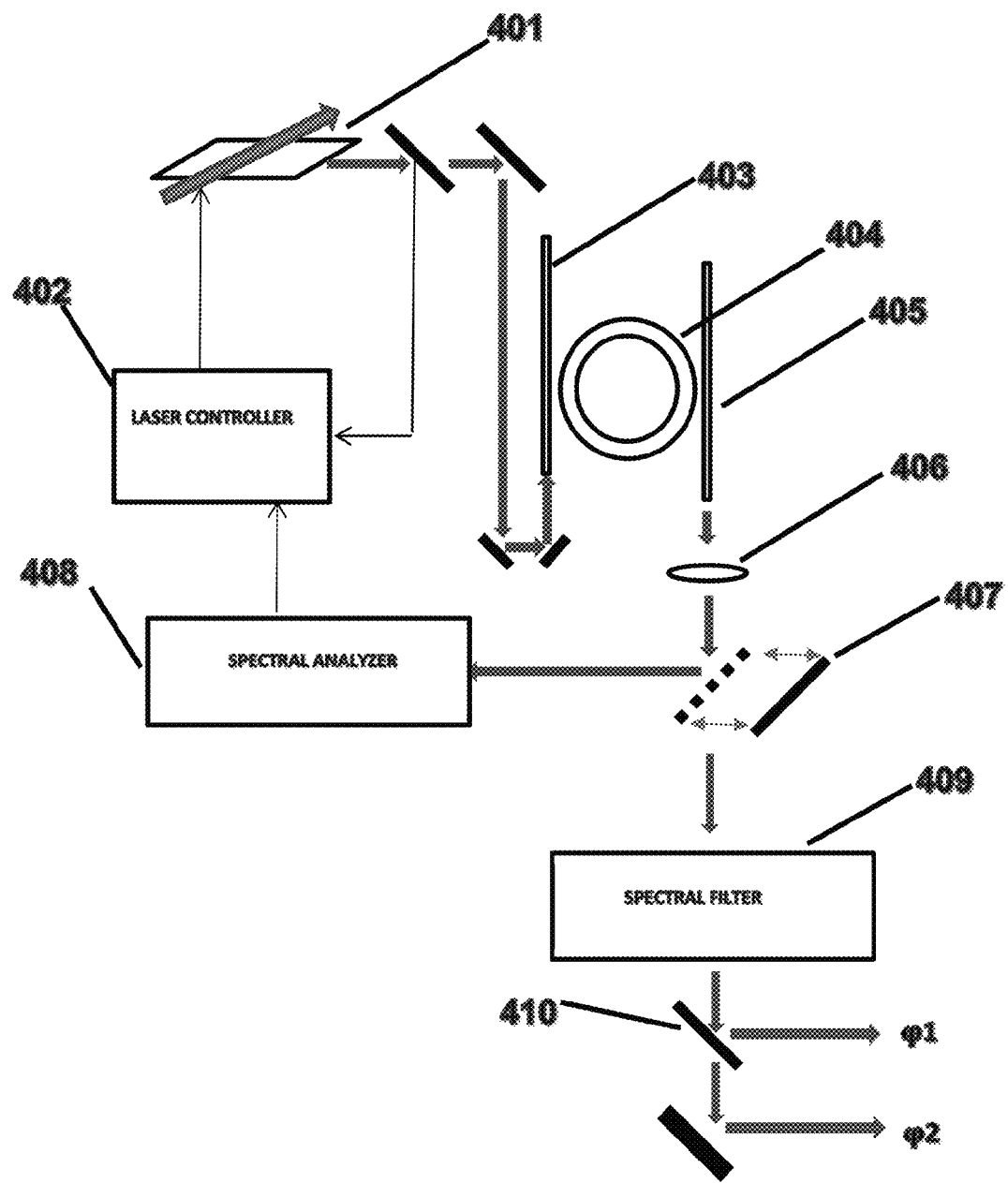
FIG. 4 provides a schematic drawing of a system configured as a source of a frequency comb of entangled photons or as a source of entangled photon pairs produced according to the principles described herein.

FIG. 4 provides a schematic drawing of a system configured as a source of a frequency comb of entangled photons or as a source of entangled photon pairs produced according to the principles described above. A system similar to that illustrated in the figure is expected to have utility for providing photon pairs, entangled at least in energy, that will be useful for some applications. It should be noted, however, that the probabilistic nature of the output coupling of the resonator may increase the uncertainty in the relative timing between the entangled photons.

As seen in the figure, the system includes a tunable laser 401 and a controller 402 for controlling, among other things, the output wavelength of the laser. The laser output is directed into an input waveguide 403 evanescently coupled to a disk or ring resonator 404. FWM within the resonator leads to the desired optical output which, along with other optical output, is evanescently coupled into an output waveguide 405.

Collection optics 406 collect and condition the output from the output waveguide and direct it for further processing. Although of course various alternative arrangements are possible, the arrangement shown in the figure includes a moveable mirror 407 which when in its active position directs the waveguide output into a spectral analyzer 408, which may provide, among other things, feedback information for the laser controller. When the moveable mirror is in its inactive position, the beam that is output from the waveguide may be subject to optical filtering 409, e.g. to isolate a frequency comb or entangled spectral pair.

After optical filtering, the output beam is directed to a semireflective mirror 410, which divides it into two output beams, labeled in the figure as φ1 and φ2.

The invention claimed is:

1. An apparatus for generating entangled photons by four-wave mixing, comprising a resonator and an output waveguide for the resonator, wherein:
   the resonator is an optical disk microresonator or an optical ring microresonator;
   the resonator has an operating frequency range;
   the resonator comprises a silicon nitride waveguide clad with a cladding material, the silicon nitride waveguide having a radius dimension r, a thickness dimension h, and a disk diameter dimension or ring width dimension w;
   an angular wavenumber m represents a number of wavelengths of pump radiation that fit around the resonator when the resonator is pumped by a pump beam of light at a pump frequency, such that each value of m corresponds to a mode having a respective mode frequency;
   the respective modes are spaced apart in frequency by a Free Spectral Range FSR that varies with frequency, according to a dispersion curve, in a manner that depends on r, h, and w;
   the dimensions r, h, and w are selected to place a zero-dispersion frequency, where the dispersion curve is at a minimum, within the operating frequency range;
   the dimensions r, h, and w are further selected to make the dispersion curve steeper on a low-wavenumber side of the zero-dispersion frequency and less steep on a high-wavenumber side of the zero-dispersion frequency; and
   the apparatus further comprises a broadband optical filter coupled to the output waveguide and configured to separate a first and a second spectral region from a spectral region that intervenes between said first and second spectral regions, and to pass entangled photons in the first and second spectral regions forward for further disposition.

2. The apparatus of claim 1, wherein the cladding material is silicon dioxide.

3. The apparatus of claim 2, wherein the resonator is an optical ring microresonator, r is approximately 20 μm, w is approximately 1.1 μm, and h is approximately 750 nm.

4. The apparatus of claim 3, wherein the zero-dispersion frequency is in the range 1.2-2.0 μm and m at the zero-dispersion frequency is in the range 100-200.

5. The apparatus of claim 4, wherein m at the zero-dispersion frequency is approximately 137.

6. The apparatus of claim 1, wherein the zero-dispersion frequency is in the range 1.2-2.0 μm and m at the zero-dispersion frequency is in the range 100-200.

\* \* \* \* \*